(No Model.)
S. ROSS, Jr.
SHOE STAMPING MACHINE.
No. 437,664. Patented Sept. 30, 1890.
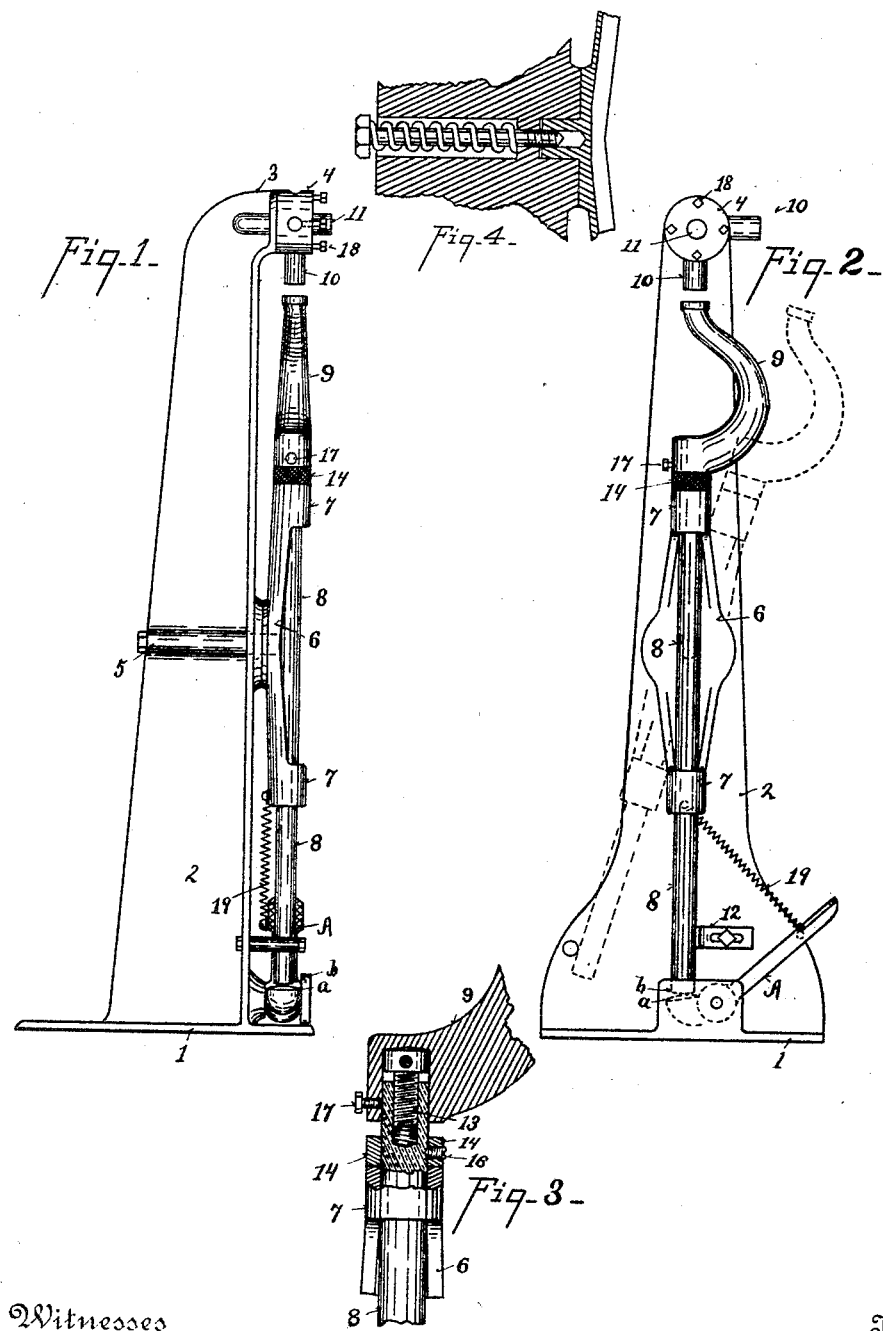
Witnesses
C. W. Miles.
Geo. Ashton.
Inventor
Simon Ross, Jr.
By his Attorneys Wood & Boyd

UNITED STATES PATENT OFFICE.

SIMON ROSS, JR., OF CINCINNATI, OHIO, ASSIGNOR TO THE ROSS-MOYER MANUFACTURING COMPANY, OF SAME PLACE.

SHOE-STAMPING MACHINE.

SPECIFICATION forming part of Letters Patent No. 437,664, dated September 30, 1890.

Application filed June 19, 1890. Serial No. 355,970. (No model.)

*To all whom it may concern:*

Be it known that I, SIMON ROSS, Jr., a citizen of the United States, and a resident of Cincinnati, in the county of Hamilton and State of Ohio, have invented certain new and useful Improvements in Shoe-Stamping Machines, of which the following is a specification.

The object of my invention is to provide a cheap and effective machine for stamping boots and shoes and other similar work where a slight blow is required, all of which will be fully set forth in the description of the accompanying drawings, making a part of this specification, in which—

Figure 1 is a side elevation of my improvement. Fig. 2 is a front elevation of the same. Fig. 3 is an enlarged sectional elevation of the adjusting mechanism. Fig. 4 is a detail view of the sliding head.

1 represents the base of the machine; 2, the frame; 3, the neck of the machine, which carries the tool-holder 4.

5 represents a shaft on which the vibratory reciprocating arm 6 journals.

7 represents a sleeve in which the spindle 8 journals longitudinally. On the top of said spindle 8 is the horn 9.

10 represents tools secured to the head 4. There may be several tools employed in the one head 4, which is adjustable circumferentially on its center 11, so as to bring a different stamping-tool into position for use.

The spindle 8 normally rests upon the inner end of the lever A. It is provided with a rounded face *a*, and the bottom of the spindle *b* is likewise rounded. As the treadle A is forced downward it raises the spindle 8 upward, and the parts *a* slide on the part *b* as it is raised.

12 represents a stop against which the spindle 8 normally rests. It is made adjustable, as shown, so that the spindle may be brought to the proper vertical line. In order to adjust the spindle vertically I provide a screw 13, which swivels in the shank of the horn 9. The end of the spindle 8 is provided with a screw-thread socket into which the screw-shank 13 taps.

14 represents a collar secured on the spindle 8 by a set-screw 16. When said collar is turned in one direction, the spindle 8 is raised by means of the nut and screw 13. When the collar is turned in the reverse direction, the spindle is lowered. The parts are held in an adjusted position by means of the set-screw 17.

18 represents set-screws for holding the tools 10 in position.

19 represents a spring connected to the sleeve 7 and to the treadle A. The weight of the spindle 8 draws the treadle up normally in the position shown in Fig. 2. As the treadle A is depressed, the spring 19 is strained. When the pressure is removed from the treadle, the spindle drops into position and the treadle rises ready for a second operation.

The machine is operated as follows: The horn 9 is turned toward the operator, in the position shown in dotted lines, Fig. 2, the shoe or boot is placed in position on the horn, and the spindle 8 pushed back under the tool 10. Then the operator presses on the treadle A and raises the spindle, carrying the heel against the tool 10, giving it a blow. The operator then releases his foot from the treadle, moves the horn forward, removes the shoe, and replaces it by another.

Having described my invention, what I claim is—

1. The combination, with the frame 1, of the vibratory reciprocating arm journaled thereon and having sleeves, the spindle vertically movable in said sleeves, and the treadle engaging the spindle, substantially as described.

2. The combination, with the frame 1, of the vibratory reciprocating arm journaled thereon and having sleeves 7, the spindle vertically movable in said sleeves, the horn secured to and vertically adjustable upon the spindle, and the treadle engaging the lower end of said spindle, substantially as described.

3. The combination, with a frame, and a circumferentially-adjustable tool-holder, of the vibratory reciprocating arm journaled thereon, having sleeves 7, the spindle vertically movable in said sleeves, the horn secured to and vertically adjustable upon the spindle, and the treadle engaging the lower end of said spindle, substantially as described.

4. The combination of the horizontally and vertically journaled spindle, the horn vertically adjustable thereon, and the treadle engaging the lower end of said spindle, substantially as described.

5. The combination of the horizontally and vertically journaled spindle, the circumferentially-adjustable tool-holder, and the treadle, substantially as described.

In testimony whereof I have hereunto set my hand.

SIMON ROSS, JR.

Witnesses:
T. SIMMONS,
C. W. MILES.